US005621160A

United States Patent [19]

Carroll, III et al.

[11] Patent Number: 5,621,160

[45] Date of Patent: Apr. 15, 1997

[54] APPARATUS AND METHOD FOR DETERMINING START OF INJECTION IN A FUEL INJECTED INTERNAL COMBUSTION ENGINE

[75] Inventors: John T. Carroll, III; Thomas L. Bailey, both of Columbus, Ind.

[73] Assignee: Cummins Engine Company, Inc., Columbus, Ind.

[21] Appl. No.: 625,372

[22] Filed: Apr. 1, 1996

[51] Int. Cl.[6] .......... G01M 15/00

[52] U.S. Cl. .......... 73/119 A; 364/431.051

[58] Field of Search .......... 73/119 A, 49.7, 73/115, 116, 117.2, 117.3, 118.1, 760, 862.381, 862.49; 364/431.05

[56] References Cited

U.S. PATENT DOCUMENTS

| | | | |
|---|---|---|---|
| 2,744,407 | 5/1956 | Kruger et al. | 73/49.7 |
| 3,340,728 | 9/1967 | Taylor et al. | 73/118.1 |
| 4,265,200 | 5/1981 | Wessel et al. | 123/501 |
| 4,280,659 | 7/1981 | Gaal et al. | 239/124 |
| 4,337,650 | 7/1982 | Brandt | 73/119 A |
| 4,378,695 | 4/1983 | Oshizawa et al. | 73/119 A |
| 4,463,733 | 8/1984 | Tsai | 123/501 |
| 4,463,901 | 8/1984 | Perr et al. | 239/95 |
| 4,601,086 | 7/1986 | Gerlach | 29/156.4 R |
| 4,713,965 | 12/1987 | Kobayashi | 73/119 A |
| 4,825,373 | 4/1989 | Nakamura et al. | 364/431.05 |
| 5,042,721 | 8/1991 | Muntean et al. | 239/533.3 |
| 5,076,240 | 12/1991 | Perr | 239/88 |
| 5,220,843 | 6/1993 | Rak | 73/862.49 |
| 5,301,876 | 4/1994 | Swank et al. | 239/95 |
| 5,357,924 | 10/1994 | Onishi | 123/276 |
| 5,359,883 | 11/1994 | Baldwin et al. | 73/117.3 |
| 5,453,626 | 9/1995 | DiSpigna et al. | 73/862.49 |
| 5,469,737 | 11/1995 | Smith et al. | 73/862.49 |

*Primary Examiner*—Richard Chilcot
*Assistant Examiner*—George M. Dombroske
*Attorney, Agent, or Firm*—Woodard, Emhardt, Naughton Moriarty & McNett

[57] ABSTRACT

An apparatus and method for determining start of fuel injection (SOI), preferably in an open nozzle fuel injection system, comprises means for obtaining injector train load data as a function of crank shaft timing, and a computer for sampling the data, performing a smoothing operation thereon, computing a first derivative of the smoothed injector train load data samples with respect to crank shaft timing, computing a maximum value of the first derivative, computing a predefined fraction of the maximum value of the first derivative, and mapping the predefined fraction of the maximum value of the first derivative to its corresponding crank shaft angle, wherein the corresponding crank shaft angle defines the crank shaft angle, measured in degrees relative to piston top dead center, at which SOI occurs. In an alternative embodiment, the smoothing operation and computation of the first derivative may be combined into a single operation.

36 Claims, 10 Drawing Sheets

APPARATUS AND METHOD FOR DETERMINING START OF INJECTION IN A FUEL INJECTED INTERNAL COMBUSTION ENGINE

FIELD OF THE INVENTION

The present invention relates generally to fuel injection timing in an internal combustion engine, and more specifically to systems and methods for determining fuel injection events.

BACKGROUND OF THE INVENTION

Fuel injection timing accuracy and repeatability are fundamental to diesel engine emissions, fuel consumption, durability and performance. As used herein, the term "fuel injection timing" refers to a point in the standard diesel engine cycle, measured in terms of crank shaft angle relative to piston top dead center (TDC), when fuel is introduced into the combustion chamber of the cylinder. Such fuel introduction is commonly referred to as "start of injection", or SOI. In accordance with typical operation of a diesel engine, SOI may occur several degrees in advance, or retard, of TDC at the conclusion of the compression stroke.

As used above, the term "fuel injection timing accuracy" refers to the uncertainty in establishing a mean SOI condition, wherein the level of uncertainty determines the extent to which desired engine operating conditions can be produced from standard fuel injection system settings. The term "fuel injection timing repeatability", on the other hand, refers to the uncertainty in maintaining a desired SOI condition, wherein the level of uncertainty in this case determines the extent to which desired engine operating conditions can be maintained while fuel injection system settings are held constant.

Fuel system specific definitions and procedures for estimating SOI are necessary to accommodate physical and operational fuel system differences. For example, a closed nozzle unit injector is typically fitted with a needle lift sensor and the instant of needle opening used as an SOI criterion. Although such an arrangement provides for precise closed nozzle SOI data, no such similar arrangement is applicable in an open nozzle fuel injection system due to the structural nature of an open nozzle fuel injector.

An example of one known open nozzle unit fuel injection system 10 is shown in FIG. 1. Referring to FIG. 1, a portion of an internal combustion engine 12 is shown defining a cylinder 14 therein. A piston 16 is disposed within cylinder 14 and the portion of cylinder 14 above piston 16 defines a combustion chamber 15. Piston 16 is attached to a crank shaft 18 which rotates in the direction shown to displace piston 16 within cylinder 14 between a bottom dead center (BDC) position and a top dead center (TDC) position as is known in the art.

Crankshaft 18 is coupled to a camshaft 22, typically via a gear 20, such that camshaft 22 rotates synchronously with the crankshaft 18 in the direction shown. Camshaft 22 defines a non-concentric cam lobe 24 in contact with a rocker arm 26 which is also in contact with a push rod 28. Push rod 28 is, in turn, in contact with a rocker lever 30. Rocker arm 26, push rod 28 and rocker lever 30 together define a so-called injector train.

An open nozzle fuel injector 32, which may typically be a so-called unit fuel injector, includes an injector body 34 defining a bore 36 therethrough. A first injector plunger 38 is disposed within bore 36 and includes a top plate 40. An injector return spring 42 is disposed between injector body 34 and top plate 40 such that plunger 38 is biased against rocker lever 30. A second injector plunger 44 is disposed within bore 36 below plunger 38, and an adjustable hydraulic link 46 is defined therebetween. Alternatively, plungers 38 and 44 can be combined into a single plunger having no hydraulic link therebetween. Bore 36 terminates at its lower end in an open nozzle 48.

As camshaft 22 rotates, the non-concentric cam lobe 24 actuates rocker arm 26 in the directions shown. The action of rocker arm 26 vertically actuates push rod 28 which causes rocker lever 30 to pivot about pivot point 31. The action of rocker lever 30, in turn, imparts a drive force on plunger 38 which is biased toward rocker lever 30 by spring 42. As the force of rocker lever 30 overcomes the biasing force of spring 42, plunger 38 is forced downwardly within bore 36 of fuel injector 32. As the pressure within the portion of bore 36 below plunger 44 is sufficiently increased by the action of descending plungers 38 and 44, a trapped air-fuel mixture is expelled from open nozzle 48 into the combustion chamber 15 of cylinder 14 when the piston 16 is in the vicinity of TDC at the conclusion of the compression stroke as is known in the art. Typically, fuel injection timing is controlled relative to piston TDC by adjusting the angular relationship of the crank shaft 18 and camshaft 22, and/or by adjusting the height of the hydraulic link 46 if fuel injector 32 includes both plungers 38 and 44.

It is generally known in the art that SOI information in an open nozzle fuel injection system, such as system 10 of FIG. 1, can be obtained by measuring the forces imparted to plunger 38 by rocker lever 30 as a function of the position of crank shaft 18, typically measured in degrees relative to piston 16 TDC. To this end, system 10 typically includes a toothed wheel 50 coupled to cam shaft 22 via gear 52. Alternatively, wheel 50 may be coupled directly to cam shaft 22. In either case, wheel 50 rotates in synchronism with cam shaft 22. In other known arrangements, wheel 50 is coupled, either directly or indirectly, to crank shaft 18 for synchronous rotation therewith. Regardless of the specific structural arrangement, wheel 50 ultimately rotates synchronously with crank shaft 18 so that the speed and/or angle of crank shaft 18 relative to piston TDC can be ascertained.

Wheel 50 typically includes a plurality of equally spaced apart teeth 54 and an extra tooth 56 positioned between two of the equally spaced apart teeth 54. A pickup 58 is positioned adjacent wheel 50 to detect the passage of any of teeth 54 and 56 thereby. Tooth 56 is included to provide a means for determining piston TDC, and teeth 54 are used to measure the angle of crank shaft 18 relative to piston TDC. Toothed wheel 50 and pickup 58 define a known engine speed and position sensor which is operable to provide an engine speed/position signal indicative of crank shaft angle relative to piston TDC to computer 60 via signal path 62 connected between pickup 58 and an input port of computer 60.

System 10 further includes a strain gauge sensor 64 attached to rocker lever 30 and connected to an input port of computer 60 via signal paths 66 and 68. Strain gauge sensor 64 is operable to provide an injector train load signal indicative of the load forces imparted to plunger 38 of fuel injector 32 by rocker lever 30 as is known in the art.

Computer 60 simultaneously receives the engine speed/position signal, via signal path 62, and the injector train load signal, via signal paths 66 and 68, and processes these signals as is known in the art to relate crank shaft angle to injector train load as a function thereof. Computer 60 typically further includes additional I/O lines 70 for receiving and sending data relating to the operation of other components of system 10 and of engine operating conditions. Finally, an output device 72, which is typically a plotter, is connected to computer 60 via output lines 74 so that data relating to system 10 can be plotted and thereafter viewed.

Referring now to FIG. 2, a plot of injector train load versus crank angle 80 is shown illustrating a typical open nozzle fuel injection event. The characteristic injector train load curve 80 consists of three distinct phases: (1) train compression 82, (2) transition 84, and (3) homogeneous liquid fuel injection 86. During train compression 82, injector train load increases with downward movement of plunger 38 as spring 42 and other elastic injector train components are compressed and the injection charge, consisting of air, fuel and fuel vapor, is pressurized. Transition 84 follows thereafter during which the air and fuel vapor volumes are collapsed and piston TDC 88 occurs at TDC crank angle 85. It is during transition 84 that SOI occurs at an SOI angle referenced to TDC crank angle 85. The fuel injection event concludes with homogeneous liquid fuel injection 86 during which injector train loads rise sharply and the remaining fuel is expelled from open nozzle fuel injector 32.

A number of subjective criteria for determining SOI information in an open nozzle fuel injection system, such as system 10 of FIG. 1, are known. An example of one such criterion is a so-called Rocker Load Threshold (RLT) approach. The RLT approach defines SOI as the crank angle, measured in degrees relative to piston TDC, corresponding to the point on the injector train load curve that injector train load first achieves a specified threshold level. A graphical example of the RLT approach is shown in FIG. 3.

Referring to FIG. 3, injector train load versus crank shaft angle 80 is shown. The point 88 on the injector train load curve 80 corresponding to piston TDC is shown as occurring within a range 90 of injector train load threshold values. Similarly, the crank shaft angle 85 corresponding to piston TDC is shown as occurring within a range 92 of possible crank shaft angles, wherein the range of possible crank shaft angles corresponds to the range of injector train load threshold values. In accordance with the RLT technique, the SOI crank angle is defined as the crank angle, within crank angle range 92, that corresponds to a predefined injector train load threshold value that occurs within injector train load threshold range 90.

The RLT approach illustrated in FIG. 3 has several drawbacks associated therewith. First, small anomalies in the shallow portion of the injector train load response can produce false SOI indications. While increasing the injector train load threshold value effectively reduces the sensitivity to such anomalies, locating the threshold value above the transition region has the disadvantage that the load and load rate differences between operating conditions produce inconsistencies in estimates of absolute SOI. Secondly, SOI variability is sensitive to the slope of the injector train load response 80 in the transition region and to vertical displacements of the threshold value and load response. Third, the RLT technique requires, as a consequence of inherent subjectivities associated therewith, that an injector train load threshold value to be chosen for a particular operating condition and subsequently applied to all operating cylinders and injection events during the observation period. Compromise is therefore required when SOI variability is great. Further, SOI determination is sensitive to the DC component of strain gauge output for between engine and cylinder comparisons.

Another known subjective criterion for determining SOI information in an open nozzle fuel injection system is a so-called Rocker Load Intersection (RLI) approach. The RLI approach defines SOI as the crank angle, measured in degrees relative to piston TDC, corresponding to the point on the injector train load curve at which best fit lines approximating the slopes of the injector train compression and homogeneous liquid fuel injection portions of the injector train load curve intersects. A graphical example of the RLI approach is shown in FIG. 4.

Referring to FIG. 4, the injector train load response 80 versus crank angle is shown. A best fit line 94 is drawn through the injector train compression portion of response 80 and a best fit line 6 is drawn through the homogeneous liquid fuel injection portion. As shown in FIG. 4, best fit lines 94 and 96 intersect at intersection point 98. In accordance with the RLI approach, the crank angle 100 corresponding to intersection point 98 is the SOI crank angle.

As with the RLT approach, the RLI approach suffers from several drawbacks. First, the RLI approach is largely a manual graphical technique that is often difficult to apply in practice, particularly for operating modes having long transition phases and short homogeneous liquid fuel injection phases. Secondly, the RLI approach ignores the transition phase of the injector train load response, which is commonly held as the phase in which SOI occurs. Rather, the RLI approach depends entirely on the slopes of the train compression and homogeneous liquid fuel injection portions of the injector train load response, which can lead to inherent inaccuracies and variability in SOI determinations.

From the foregoing explanation, it should be apparent that both the RLT and RLI approaches can lead to inaccurate and highly variable SOI determinations. The inherent subjectivity in the selection of the injector train load threshold value in the RLT approach, and in the fit of the straight line segments in the RLI approach, introduce further uncertainty in SOI determinations.

A reference standard is the foundation of any useful measurement approach since it provides a basis for quantitative data comparison. Such a standard, including appropriate definitions and procedures, is necessary if comparisons of SOI are to be made within cylinders, between cylinders, and between engines for the purpose of assessing operational variability. An ideal reference standard should minimize procedural and measurement system contributions to the observed variability and maximize the signal to noise ratio consistent with good measurement practice. What is therefore needed is an objective technique for determining SOI in an open nozzle fuel injection system that minimizes inaccuracies and measurement variability attributable to the technique and maximizes measurement repeatability.

SUMMARY OF THE INVENTION

The present invention addresses the foregoing shortcomings of known techniques for determining SOI in open nozzle fuel injection systems. In accordance with the invention, an objective criterion for determining SOI in an open nozzle fuel injection system defines SOI as the crank angle, measured in degrees relative to piston TDC, corresponding to the point in the injector train load response at which the rate of change of injector train load achieves a predefined fraction of its maximum value. To this end, an injector train load sensor provides an injector train load signal, and an engine position/speed sensor provides a crank shaft timing signal, to a computer. The computer is operable to sample the injector train load and crank shaft timing signals and determine therefrom injector train load data as a function of crank shaft angle or as a function of time for later conversion to crank shaft angle. The injector train load data is then smoothed and a first derivative thereof is computed with respect to crank shaft angle or with respect to time. A maximum value of the first derivative is computed and multiplied by a predefined fraction thereof. The crank shaft angle, relative to piston TDC, corresponding to the predefined fraction of the maximum value of the first derivative is defined as the SOI crank shaft angle.

One object of the present invention is to provide an objective criterion for determining SOI in an open nozzle fuel injection system.

Another object of the present invention is to minimize the effect of such a criterion on inaccuracies and measurement variability in determining SOI information.

Yet another object of the present invention is to maximize the effect of such a criterion on repeatability of SOI determinations.

These and other objects of the present invention will become more apparent from the following description of the preferred embodiment.

DESCRIPTION OF THE PREFERRED EMBODIMENT

Figure 1:
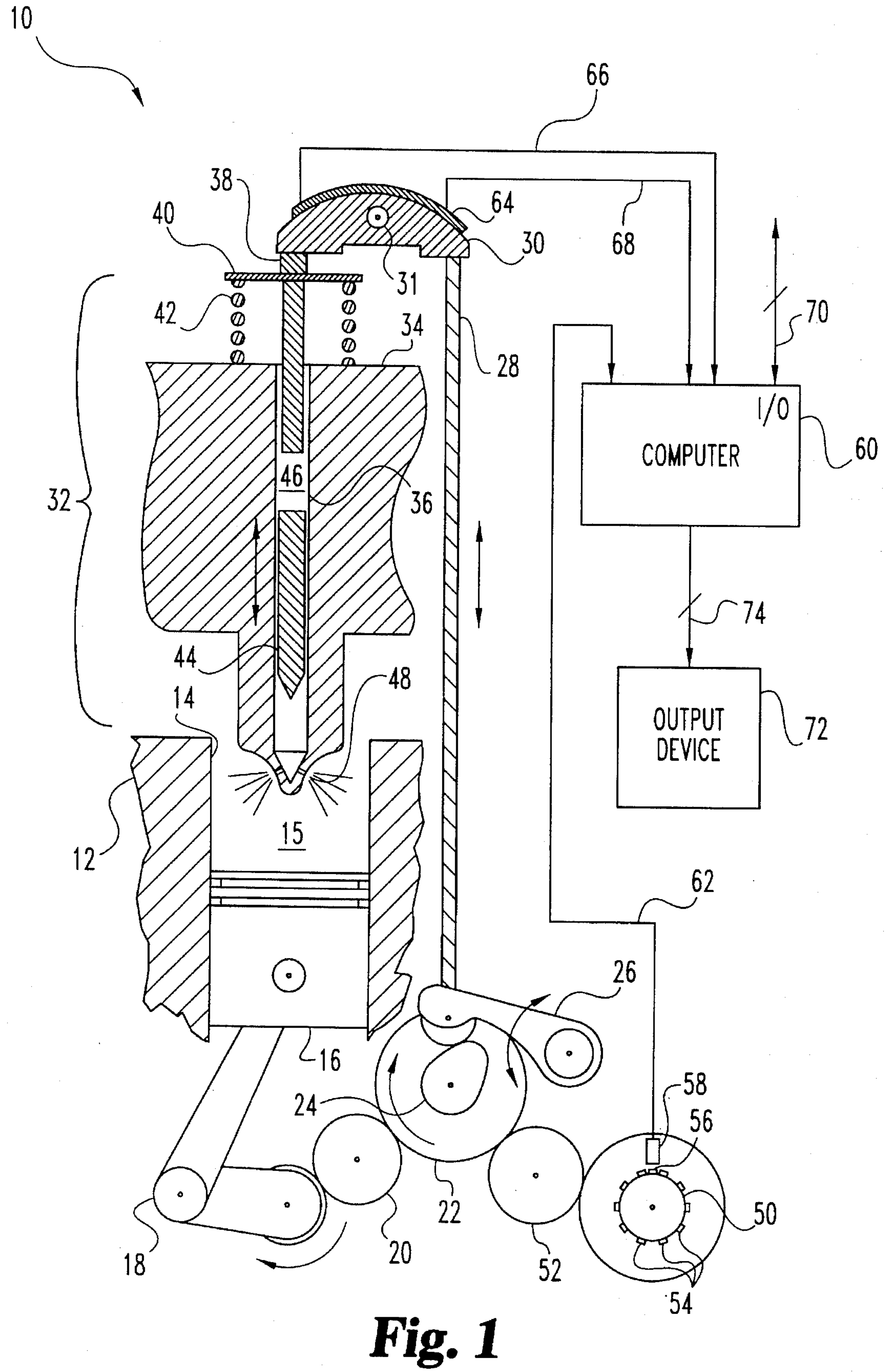
Fig. 1 (PRIOR ART)
FIG. 1 is a partial cross-sectional view of a known system for determining SOI in an open nozzle fuel injection system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention utilizes the open nozzle fuel injection system 10 shown in FIG. 1 and described in the BACKGROUND section to provide an objective technique for determining SOI in such a system. System 10, as used in the present invention, is substantially identical to that shown and described with respect to FIG. 1 so that the basic description thereof need not be repeated. However, certain modifications to the structure of system 10, in accordance with the present invention, should be pointed out.

A fuel injection charge consisting of air, fuel and fuel vapor is expelled from the nozzle 48 of the fuel injector 32 by the downward motion of the plungers 38 and 44 when the piston 16 is in the vicinity of TDC at the conclusion of the compression stroke. The force moving plungers 38 and 44 in the downward direction is developed in the injector train components, defined by rocker arm 26, push rod 28 and rocker lever 30, by cam shaft 22 driven by crank shaft 18. The fuel injector 32 is thus mechanically driven by crankshaft 18 against the opposing biasing force of injector spring 42. Preferably, fuel injector 32 is a unit-type open nozzle fuel injector, although the present invention contemplates that the concepts described herein may be used with any type of fuel injector including those having a fuel intensifier (not shown) in place of the described plunger structure. Moreover, while fuel injector 32 is shown and described as being mechanically driven by crankshaft 18 against the opposing biasing force of injector spring 42 via the injector train components, the present invention contemplates that the injector train components may comprise any known link which couples crankshaft 18 to the fuel injector plunger 38. For example, the "injector train" may be a known hydraulic fuel injector drive unit which is actuated by crankshaft 18 to drive fuel injector 32.

Although system 10 of FIG. 1 is shown, and was previously described, as having a strain gauge sensor 64 operatively associated with rocker lever 30 for providing an injector train load signal to computer 60 via signal paths 66 and 68, those skilled in the art will recognize that any known sensor, or other known means to obtain information related to the potential energy in the injector 32 and/or injector train components 26, 28 and/or 30, may be used to provide such a signal. Further, although toothed wheel 50 and pick up 58 is shown, and was previously described, as providing a crank shaft angle signal to computer 60 via signal path 62, it is to be understood that any such sensor may be used to provide a crank shaft timing signal that is either crank angle-based (crank angle position) or time-based (time sampled with known engine speed). Computer 60 may be configured to process either type of signal and convert at any time thereafter such a crank shaft timing signal to a crank angle, relative to a predefined position of crank shaft 18, preferably TDC of piston 16, as is known in the art of diesel engine operation.

In accordance with the present invention, computer 60 is equipped with a software algorithm for objectively determining SOI in a fuel injection system of an internal combustion engine. Computer 60 is therefore of the type having ROM, RAM and sufficient computing power to implement the software algorithm of the present invention. Computer 60 may therefore be a known personal computer (PC), preferably having at least a 386-type processor, any of a number of known industrial-type or special purpose computers, or a vehicle control computer. It is to be understood that although such SOI measurements are typically carried out during engine development in a laboratory or other setting, the present invention contemplates utilizing the concepts of the present invention in an operating vehicle to provide the vehicle control computer 60 with real-time information relating to SOI and/or other fuel injection events.

Figure 2:
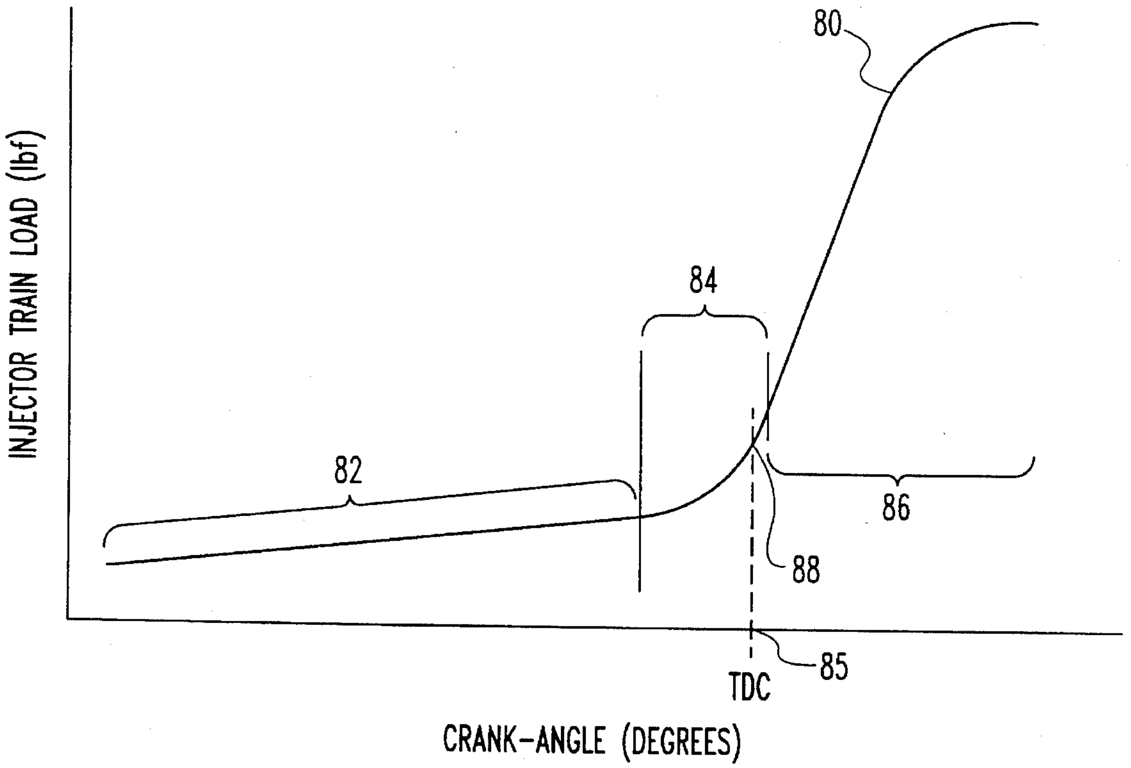
Fig. 2 (PRIOR ART)
FIG. 2 is a plot of injector train load versus crank shaft angle obtained by the system of FIG. 1.
Figure 5:
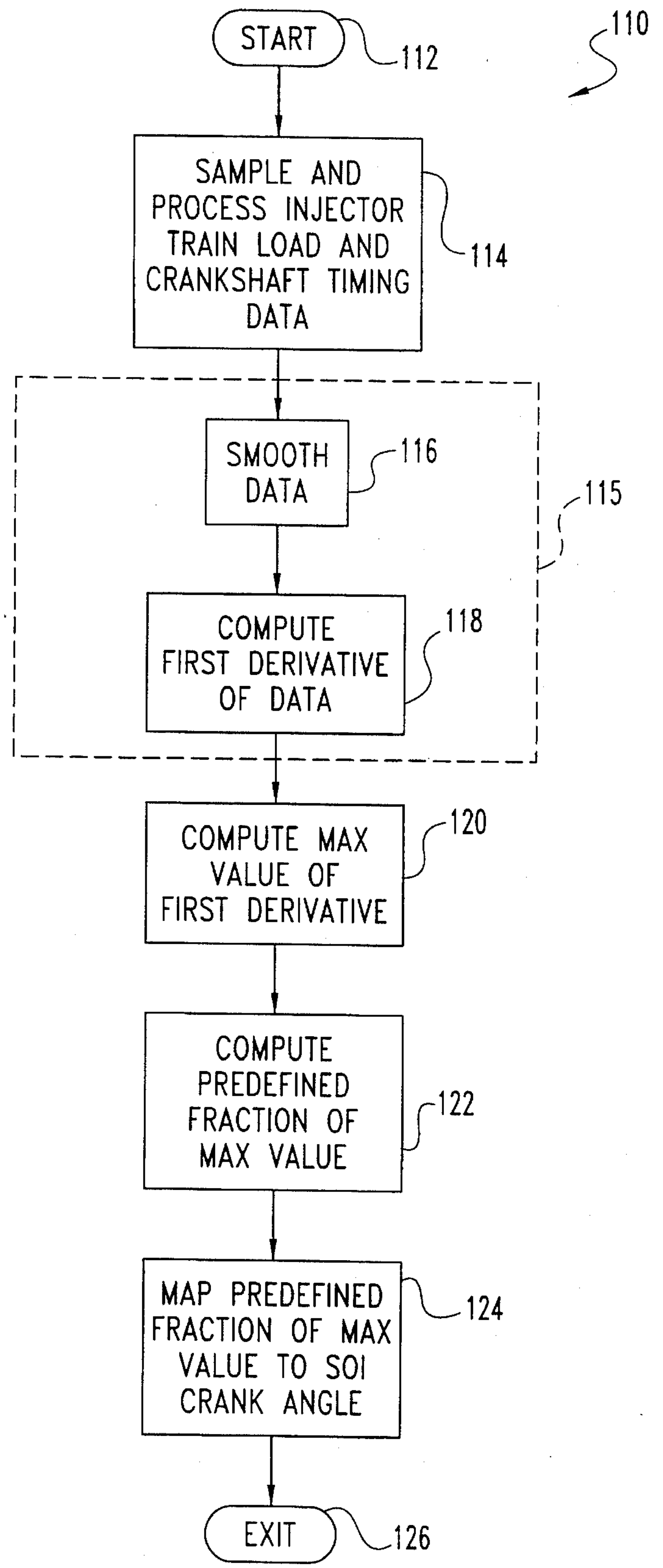
FIG. 5 is a flow chart illustrating one preferred embodiment of a software algorithm executable by a computer to perform the injector train load rate technique of the present invention to determine SOI in a fuel injection system.

Referring now to FIG. 5, a flow chart illustrating a preferred embodiment of a software algorithm 110 executable by the computer 60 of FIG. 1, in accordance with the present invention, is shown. The algorithm 110 starts at step 112 and at step 114, computer 60 samples the injector train load signal on signal paths 66 and 68, as well as the crank shaft timing signal on signal path 62. Although any desired sampling frequency f may be used to sample the injector train load and crank shaft timing signals, it is to be understood that f should be high enough to provide sufficient data points to substantially reconstruct the injector train load response 80, particularly with respect to the transition portion 84 thereof (see FIG. 2).

Computer 60 is further operable in step 114 to process the sampled data to maintain sequential pairings of injector train load data and corresponding crank shaft timing data to thereby provide for a sampled representation of injector train load data as a function of either crank shaft angle or time. Those skilled in the art will recognize that conversion between crank shaft angle and time may easily be made at any time in the algorithm of FIG. 5 in accordance with known relationships if the rotational speed of crank shaft 18 is known. As previously indicated, the present invention contemplates that toothed wheel 50 and pick up 58 may be configured to provide computer 60 with either a crank shaft position signal, as a crank shaft angle relative to a predefined position thereof (preferably piston TDC), or an engine speed signal that may be converted at any time thereafter to a crank angle relative to a predefined crank shaft position. The term "crank shaft timing" thus refers to either type of crank shaft data.

As one alternative to the foregoing description of step 114, known uniform crank angle-based or time-based sampling techniques may be used wherein the crank angle information can be implicitly computed for each injector train load sample as long as the crank shaft angle of the first data sample is known. In such a case, the sampling portion of step 114 requires only that computer 60 sample injector train load data, and the processing portion of step 114 requires implicitly determining crank angle information for each of the injector train load samples to thereby provide for a sampled representation of injector train load data as a function of either crank shaft angle or time. Computer 60 may therefore utilize any of the foregoing techniques to provide sampled injector train load data as a function of crank shaft timing.

Algorithm execution continues from step 114 at step 116 where the sampled injector train load data, as a function of time or crank shaft angle, is subjected to a data smoothing operation. Although any known data smoothing technique may be used in step 116, a quadratic moving average data smoothing technique, in accordance with one aspect of the present invention, is preferably used. Such a quadratic moving average technique will be described more fully hereinafter with respect to FIGS. 7–9. From step 116, the algorithm continues at step 118 where computer 60 computes a first derivative of the smoothed injector train load data samples with respect to either time or crank shaft angle. In accordance with the present invention, computer 60 may use any known numerical technique for computing the first derivative of the smoothed injector train load data samples such as, for example, Euler's method, although preferably a fourth order central finite difference relationship is used. The fourth order central finite difference approximation of a first derivative is given by the equation:

$$du_i/dx=(-u_{i+2}+8u_{i+1}-8u_{i-1}+u_{i-2})/(12\Delta x) \quad (1),$$

where $u_i$, i=1, n represents the ith injector train load data sample out a total of n such samples, x represents the crank shaft timing parameter (time or crank angle), and Δx represents the difference between adjacent crank shaft timing parameter samples. The first derivative of the smoothed injector train load data samples is computed using equation (1), preferably sequentially, at each sampled data point $u_i$.

Figure 6A:
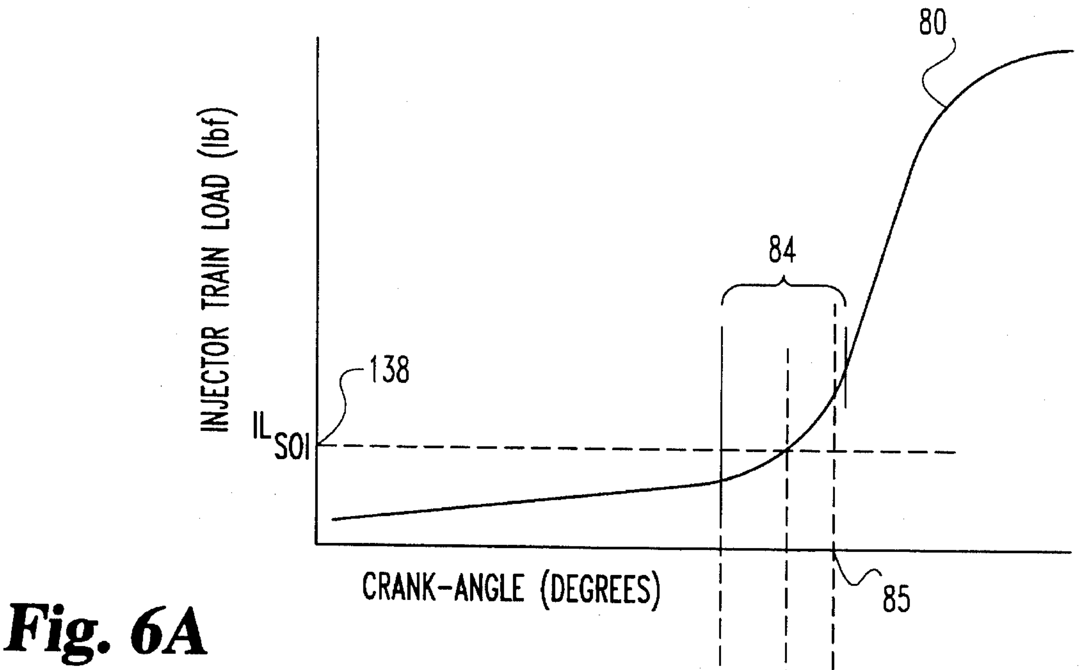
FIG. 6 is composed of FIGS. 6A and 6B and graphically illustrates the operation of the algorithm of FIG. 5 in an open nozzle fuel injection system.
Figure 6B:
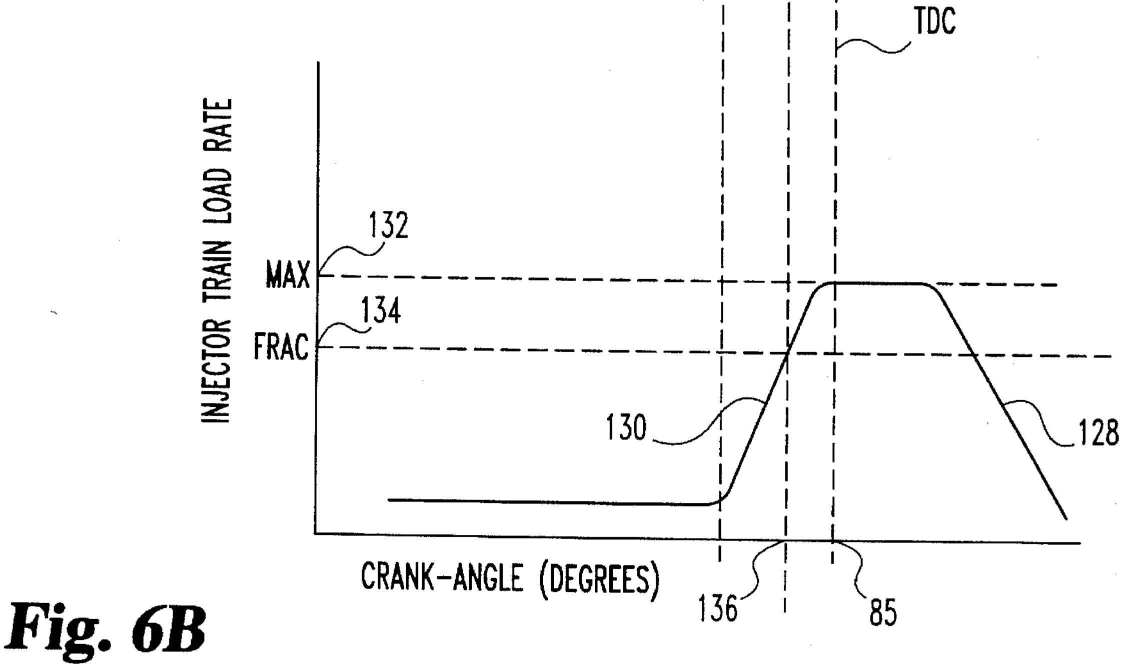

Referring now to FIGS. 6A and 6B, a graphical representation of injector train load response 80 and first derivative 128 thereof, corresponding to the rate of change of injector train load with respect to crank shaft timing, and plotted versus crank shaft angle, is shown. The plots of FIGS. 6A and 6B have identically scaled horizontal axes showing the location thereon of the crank angle 85 corresponding to piston TDC. The transition portion 84 of the injector train load response 80 corresponds to an increasing rate of change of injector train load as shown by increasing portion 130 of first derivative curve 128.

Referring now to FIGS. 5, 6A and 6B simultaneously, the algorithm continues from step 118 at step 120 where computer 60 computes a maximum value 132 of the first derivative 128 of the smoothed injector train load data sample response 80. In accordance with the present invention, computer 60 may use any known technique for computing such a maximum value 132 such as, for example, by setting equation (1) equal to zero and solving for a corresponding value of $u_1$. Preferably, however, a table of first derivative data values, and corresponding crank shaft timing parameter values, is maintained, and a maximum value sort or search is conducted by computer 60, preferably in the forward direction (corresponding to increasing crank shaft angle values), to determine the maximum value 132 of the first derivative 128.

The algorithm continues from step 120 at step 122 where computer 60 computes a predefined fraction 134 of the maximum value 132 of the first derivative 128 of the injector train load response 80. Preferably, the predefined fraction 134 is computed by multiplying the maximum value 132 by a multiplier. The multiplier may be arbitrarily defined as any fraction between 0.0 and 1.0 to thereby provide an objective base line for relating SOI measurements thereto. Preferably, however, the multiplier is selected in accordance with empirical data relating to the given engine, fuel injection system and other factors, which provides an approximate estimate of SOI. Although it is preferable to choose the multiplier such that the resulting multiplication at step 122 produces the FRAC value 134 corresponding to the injector train load value $IL_{SOI}$ 138 at which SOI actually occurs, it is to be understood that such a precisely defined multiplier is not necessary since any fixed value for the multiplier will produce an objective FRAC value 134 which provides a fixed base line from which SOI measurements can be compared.

The algorithm continues from step 122 at step 124 where computer 60 maps the predefined fraction 134 of the maximum value 132 of the first derivative 128 of the injector train load response to its corresponding crank shaft angle 136. Preferably, step 124 is accomplished by searching the first derivative data 128 for the FRAC value. The crank shaft timing value corresponding thereto corresponds to the crank shaft timing data at which SOI occurs in accordance with the concepts of the present invention. Determination of the actual crank shaft angle corresponding to the FRAC value depends upon the form of the crank shaft timing data. For example, if the crank shaft timing data is composed of crank shaft angles relative to piston TDC, then determination of the actual crank shaft angle at which SOI occurs (SOI crank angle 136) consists simply of reading the crank shaft timing data associated with the FRAC data value. On the other hand, if the crank shaft timing data consists of time-based data, then determination of the SOI crank angle 136 requires reading the crank shaft timing data associated with the FRAC data value, and converting this crank shaft timing data to crank angle data in degrees relative to piston TDC.

The algorithm continues from step 124 at step 126 where the algorithm is terminated or, alternatively, returned to its calling routine. From the foregoing, it should now be apparent that the present invention provides for an objective criterion for determining SOI, particularly in a mechanically actuated open nozzle fuel injection system, where SOI is defined as the crank angle, measured in degrees relative to piston TDC, corresponding to the injector train load at which the rate of change of injector train load achieves some predefined fraction of its maximum value.

Figure 7A:
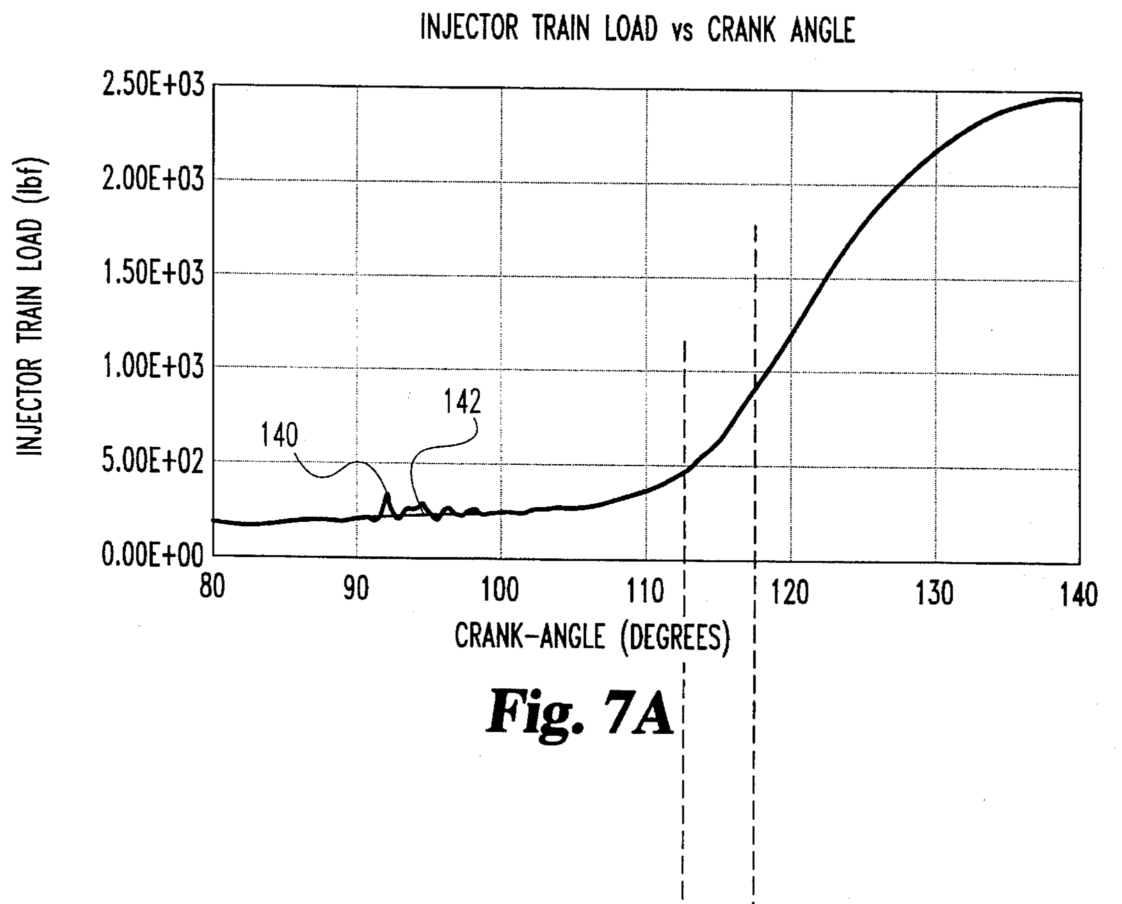
FIG. 7 is composed of FIGS. 7A and 7B and illustrates use of the injector train load rate technique of the present invention in the open nozzle fuel injection system of FIG. 1.
Figure 7B:
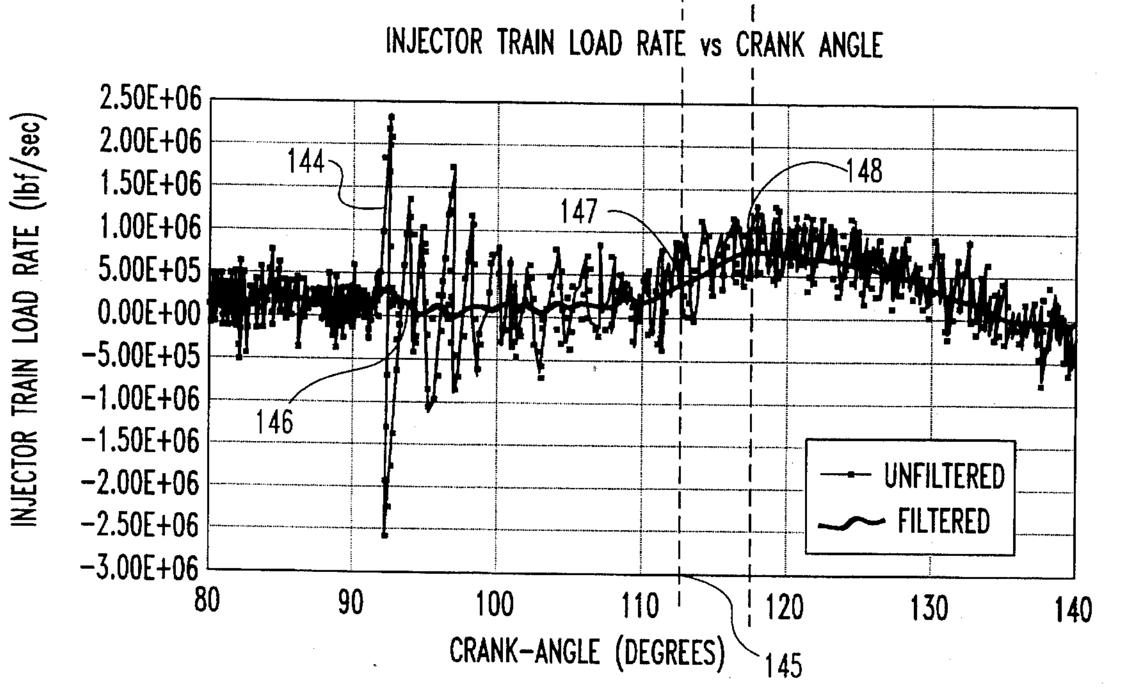

Referring now to FIGS. 7A and 7B, an example of an implementation of the algorithm of FIG. 5 in the system of FIG. 1 with respect to actual injector train load data is shown. Referring specifically to FIG. 7A, injector train load data samples 140 as a function of crank shaft timing were acquired by computer 60 in accordance with step 114 of algorithm 110. The injector train load data was sampled at a rate of 100 kHz with the engine operating at peak torque. Smoothed data set 142 was then produced therefrom by computer 60 in accordance with a quadratic moving average data smoothing technique (to be fully discussed hereinafter) at step 116 of algorithm 110.

Referring specifically to FIG. 7B, the first derivative 146 of the smoothed injector train load data set (filtered injector train load rate) 142, with respect to crank shaft timing, was calculated by computer 60 in accordance with step 118 of algorithm 110. For comparison, the first derivative 144 of the original injector train load data set (unfiltered injector train load rate) 140 is also shown. It bears pointing out that the crank shaft timing parameter used for the computation of derivatives 144 and 146 is time so that a subsequent conversion to crank angle, relative to piston TDC, must subsequently be made in accordance with algorithm 110.

In accordance with step 120 of algorithm 110, the maximum value 148 of the filtered injector train load rate 146 appears to be approximately 0.8 * $10^6$ lbf/sec. For the example of FIGS. 7A and 7B, the predefined fraction multiplier of step 122 of algorithm 110 was chosen to be 0.5. Thus, the predefined fraction 147 of the maximum value 148 of the injector train load rate 146 must be approximately 0.4 * $10^6$ lbf/sec.

Finally, in accordance with step 124 of algorithm 110, the predefined fraction 147 of the maximum value 148 of the injector train load rate 146 must be mapped to a crank angle corresponding thereto. Since the injector train load rate 146 was computed with respect to time, a conversion to crank angle must therefore first be made in accordance with well known techniques (not shown). From FIG. 7B, the crank angle corresponding to the predefined fraction 147 of the maximum value 148 of the injector train load rate 146 appears to be approximately 123.5 degrees. Thus, the SOI crank angle, in accordance with algorithm 110 of FIG. 5, is approximately 123.5 degrees relative to piston TDC.

A preferred technique for smoothing the sampled injector train load data response 80, in accordance with step 116 of FIG. 5, will now be discussed in detail. In situations where data smoothing techniques are appropriate for clarifying a base response, such as with the sampled injector train load data of the present invention, care must be exercised to formulate a technique that minimizes distortions of the base response, particularly with respect to its features of interest. In the case of injector train load data having the general characteristics described with respect to response 80 of FIG. 2, arithmetic moving average techniques tend to distort the base response in the vicinity of the transition portion 84. In accordance with one aspect of the present invention, a quadratic moving average data smoothing technique has therefore been developed which produces substantially less distortion of the base response 80, particularly in the transition portion 84.

The quadratic moving average data smoothing technique of the present invention requires recomputing each injector train load data point in accordance with a quadratic polynomial equation of the form:

$$u_i=a_ix_i^2+b_ix_i+c_i \qquad (2),$$

where $u_i$ are the smoothed injector train load data points, $x_i$ are the crank shaft timing parameter data points, and the coefficients $a_i$, $b_i$ and $c_i$ are computed for each of the n data points by minimizing the sum of squares errors at k adjacent data points, wherein the number k determines the degree of smoothing. The degree of smoothing can be specified explicitly or implicitly in terms of a low pass filter frequency in accordance with the equation:

$$k=f_s/(4*f_f) \qquad (3),$$

where $f_S$ is the data sampling frequency previously discussed and $f_f$ corresponds to the low pass filter frequency.

The coefficients $a_i$, $b_i$, and $c_i$ are computed to satisfy the condition that derivatives of the sum of squares errors with respect to each of the foregoing coefficients are zero valued. In matrix notation, the equation set to be solved in determining the coefficients $a_i$, $b_i$, and $c_i$ is:

$$\begin{bmatrix} a_i \\ b_i \\ c_i \end{bmatrix} = \begin{bmatrix} \Sigma x^4 & \Sigma x^3 & \Sigma x^2 \\ \Sigma x^3 & \Sigma x^2 & \Sigma x \\ \Sigma x^2 & \Sigma x & \Sigma 1 \end{bmatrix}^{-1} \begin{bmatrix} \Sigma yx^2 \\ \Sigma yx \\ \Sigma y \end{bmatrix}. \qquad (4)$$

Figure 8:
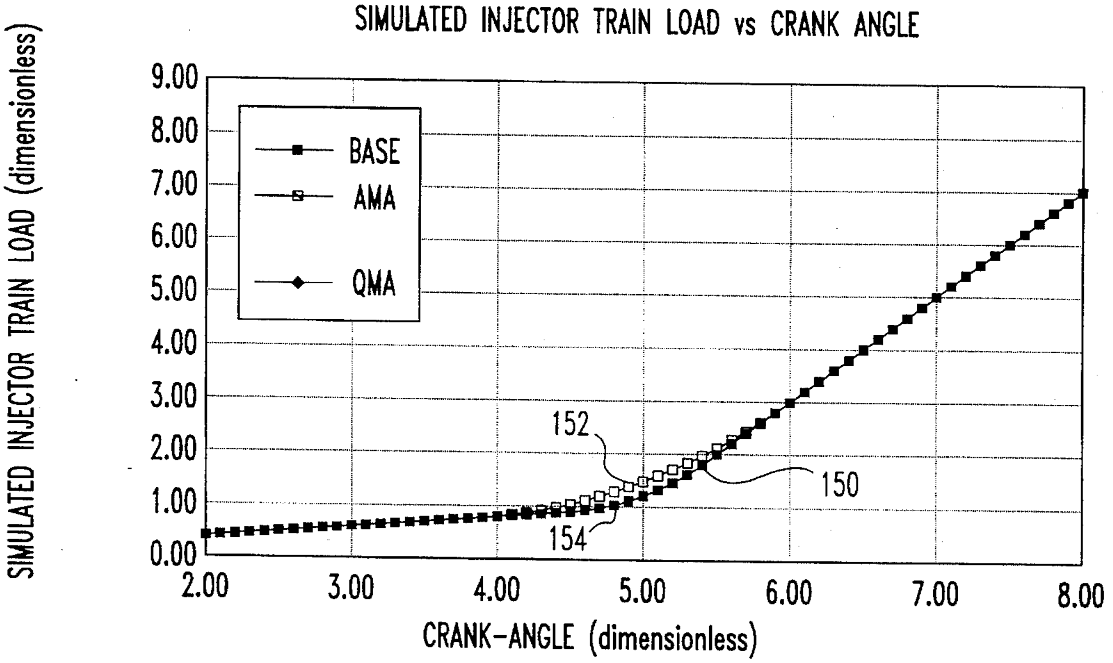
FIG. 8 is a plot of simulated injector train load versus crank shaft angle illustrating the effect of a quadratic moving average data smoothing technique as compared to an arithmetic moving average data smoothing technique, in accordance with the present invention.
Figure 9:
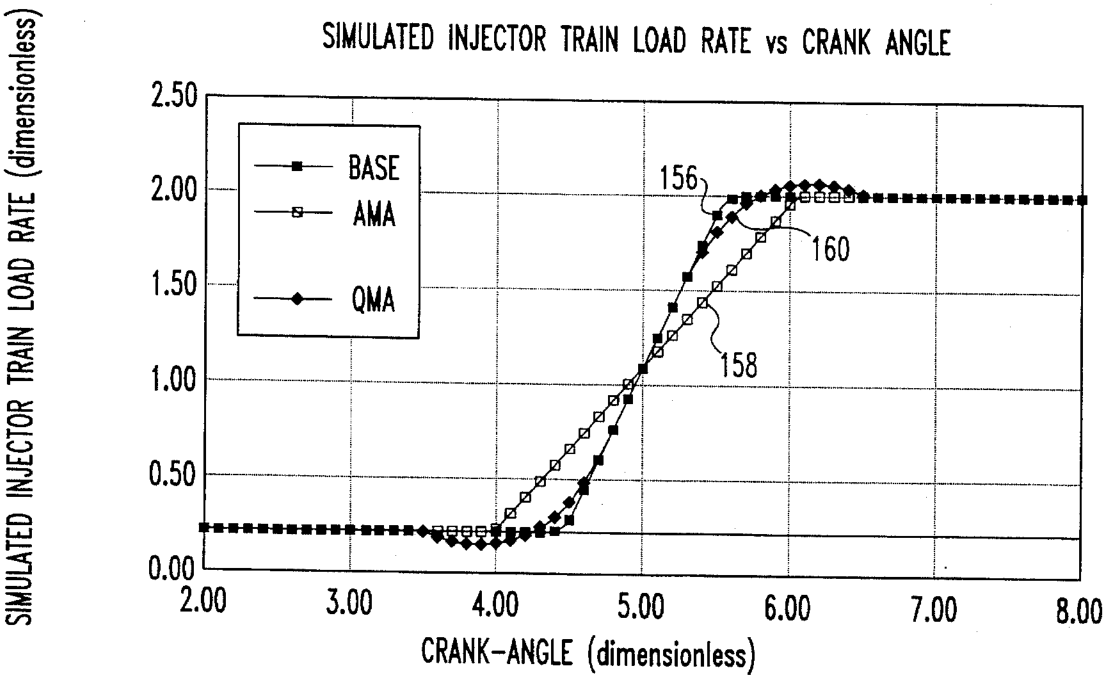
FIG. 9 is a plot of the first derivative of the data shown in FIG. 8.
Figure 10:
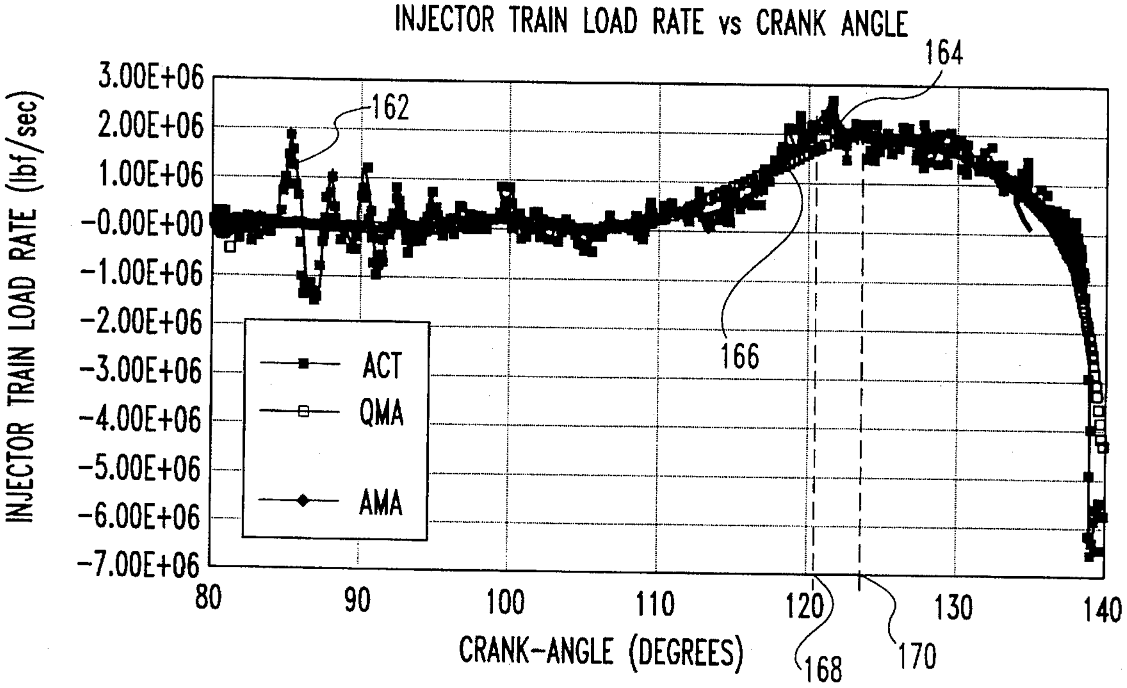
FIG. 10 is a plot of the first derivative of actual injector train load data versus crank shaft angle illustrating the effect of the quadratic moving average data smoothing technique versus an arithmetic moving average data smoothing technique.

Referring now to FIGS. 8–10, a comparison between the foregoing quadratic moving average data smoothing technique and a known arithmetic moving average data smoothing technique is made. Referring specifically to FIG. 8, a simulated base injector train load response (BASE) 150 versus crank angle is shown which magnifies the rising knee of the transition portion. As evident from FIG. 8, the arithmetic moving average data smoothing technique (AMA) 152 distorts the BASE data in the vicinity of the rising knee of the transition portion whereas the quadratic moving average data smoothing technique (QMA) 154 tracks the BASE data nearly identically.

The effect of utilizing the QMA approach as compared to the AMA approach is particularly evident upon observation of the simulated first derivative of the injector train load data (injector train load rate) in the vicinity of the transition portion of the response, as shown in FIG. 9. Referring to FIG. 9, the BASE injector train load rate 156 versus crank angle is shown as a reference. While the AMA data smoothing technique 158 causes significant distortion of the BASE rate 156 in the transition area, the QMA data smoothing technique 160 tracks the BASE rate fairly closely.

As discussed hereinabove, SOI in a mechanically actuated open nozzle fuel injection system occurs in the transition portion 84 of an injector train load response 80, which corresponds to the rising portion of the first derivative thereof. In accordance with the injector train load rate threshold SOI technique of the present invention, it is thus highly desirable to provide a data smoothing technique that closely tracks the base injector train load response 80 in the transition portion thereof to thereby maximize the accuracy of the smoothed injector train load rate in the rising portion thereof. Any deviation of the smoothed injector train load rate data in the vicinity of the rising portion thereof will correspondingly lead to inaccuracies in the mapping of the predefined fraction of the maximum value of the first derivative of the injector train load response to the SOI crank angle, as set forth in step 124 of FIG. 5.

Referring now to FIG. 10, an example of such inaccuracies associated with the AMA data smoothing technique is illustrated with respect to an actual sampled injector train load rate (ACT) 162 (first derivative of injector train load response) versus crank angle. The 559 point ACT data set 162 was acquired at an engine speed of approximately 1800 rpm with a 100 kHz sampling rate. The 101 point QMA data set 164 was produced with a low pass frequency $f_f$ of 500 Hz (see equation (3)) so that 50 adjacent data points (k) were considered in the QMA technique. It is apparent from an observation of FIG. 10 that the QMA data set 164 much more closely approximates the ACT data set 162 than does the 101 point AMA data set 166, particularly in the increasing portion thereof between 110 and 120 crank angle degrees. In fact, the maximum injector train load rate appears to be located at a crank angle 168 of approximately 120.5 degrees for the QMA data set 164 and at a crank angle 170 of approximately 123.5 degrees for the AMA data set 166; a difference of 3 degrees. While the inaccuracies introduced by the AMA data set 166 could be less than 3 degrees, depending upon the value of the multiplier used in the algorithm of FIG. 5, it is apparent that the known AMA technique is inherently less accurate and could drastically decrease any flexibility in the choice of multiplier used in the algorithm of FIG. 5.

In accordance with yet another aspect of the present invention, the foregoing quadratic moving average data smoothing technique may be combined with the injector train load rate estimation technique previously described in an alternate embodiment of the algorithm 110 of FIG. 5. As a result, the smoothing step 114 and first derivative computation step 116 thereof may be replaced by a single data smoothing and injection train load rate estimation step 115 as shown in FIG. 5.

In a preferred implementation of step 115, uniform time-based data data sampling is used, as previously discussed, so that the time Δt between data samples remains constant. In accordance with known relationships interrelating a variable, that variable's velocity and the variable's acceleration, the following equation set may be used for sampled data with a fixed Δt and assuming constant acceleration:

$$x_i = x_o + v_o i\Delta t + a i^2 \Delta t^2/2$$

$$v_i = v_o + a i \Delta t$$

$$a_i = a \qquad (5),$$

where $x_i$ are injector train load data samples, $x_o$ is the initial injector train load, $v_o$ is initial injector train load rate, $v_i$ are injector train load rate values, a is the constant injector train load acceleration value, and i is the ith of n data samples.

The least squares estimates of $x_o$, $v_o$ and are found by solving the following equation, based on n data samples:

$$\begin{bmatrix} x_i \\ x_{i+1} \\ \cdot \\ \cdot \\ \cdot \\ x_{i+n} \end{bmatrix} = \begin{bmatrix} 1 & i\Delta t & i^2\Delta t^2/2 \\ 1 & (i+1)\Delta t & (i+1)^2\Delta t^2/2 \\ \cdot & \cdot & \cdot \\ \cdot & \cdot & \cdot \\ \cdot & \cdot & \cdot \\ 1 & (i+n)\Delta t & (i+n)^2\Delta t^2/2 \end{bmatrix} \begin{bmatrix} x_o \\ v_o \\ a \end{bmatrix}. \qquad (6)$$

Equation set (6) may be rewritten in terms of the so-called zero point being associated with any point of the data set. For example, setting k=i+1, equation (6) can be rewritten in the form:

$$\begin{bmatrix} x_{-1} \\ x_o \\ \cdot \\ \cdot \\ \cdot \\ x_{n-1} \end{bmatrix} = \begin{bmatrix} 1 & -\Delta t & \Delta t^2/2 \\ 1 & 0^*\Delta t & 0^*\Delta t^2/2 \\ \cdot & \cdot & \cdot \\ \cdot & \cdot & \cdot \\ \cdot & \cdot & \cdot \\ 1 & (n-1)\Delta t & (n-1)^2\Delta t^2/2 \end{bmatrix} \begin{bmatrix} x_k \\ v_k \\ a \end{bmatrix}. \qquad (7)$$

It should be noted that the matrix of equation (7) is independent of i, and therefore needs only to be inverted once prior to computation of $v_k$ values. As k is selected at different locations, the effective "filter" transfer function is changed. The overall "filter time constant" is set by the overall number of points n in the data window. Equation (7) thus represents a quadratic moving average rate estimation technique which may be substituted for steps 114 and 116 in the algorithm 110 of FIG. 5.

One advantage of using a single step 115, rather than steps 114 and 116, is that only the velocity estimate, $v_k$, need be computed since the injector train load rate is all that is required for practice of the present invention. In any event, once obtained, the velocity data $v_k$ may be used as the estimate of injector train load rate in subsequent steps of the algorithm 110 of FIG. 5.

Those skilled in the art will recognize that the algorithm 110, in any form discussed hereinabove, may be implemented in so called "batch mode" to provide SOI data in the development phase of an internal combustion engine, or may be implemented as an iterative procedure for use on a production engine to provide valuable SOI information, as well as other injection related events, to a vehicle control computer. As an example of one application of such an iterative approach, memory of the vehicle control computer may be used to store maximum peak injector train load rate of the most recent injection cycle. In the next subsequent injection cycle, the computer may monitor injector train load rate data for the crank angle at which the injector train load rate exceeds a predefined fraction of the stored maximum injector train load rate. In this manner, the algorithm of the present invention may be used to provide a nearly real-time monitor of SOI in an operating vehicle. Such information may be used for diagnostics purposes or as part of a closed-loop fuel injection timing control system. To this end, those skilled in the art will recognize that some portions of the algorithm may be implemented with analog circuitry. For example, the analog injection train load signal may be smoothed, the resulting signal differentiated, and peak injection train load rate detected using known analog circuits. The remaining steps of the algorithm of the present invention may be carried out with digital computation, as discussed herein, or may be further processed using analog circuitry.

Figure 3:
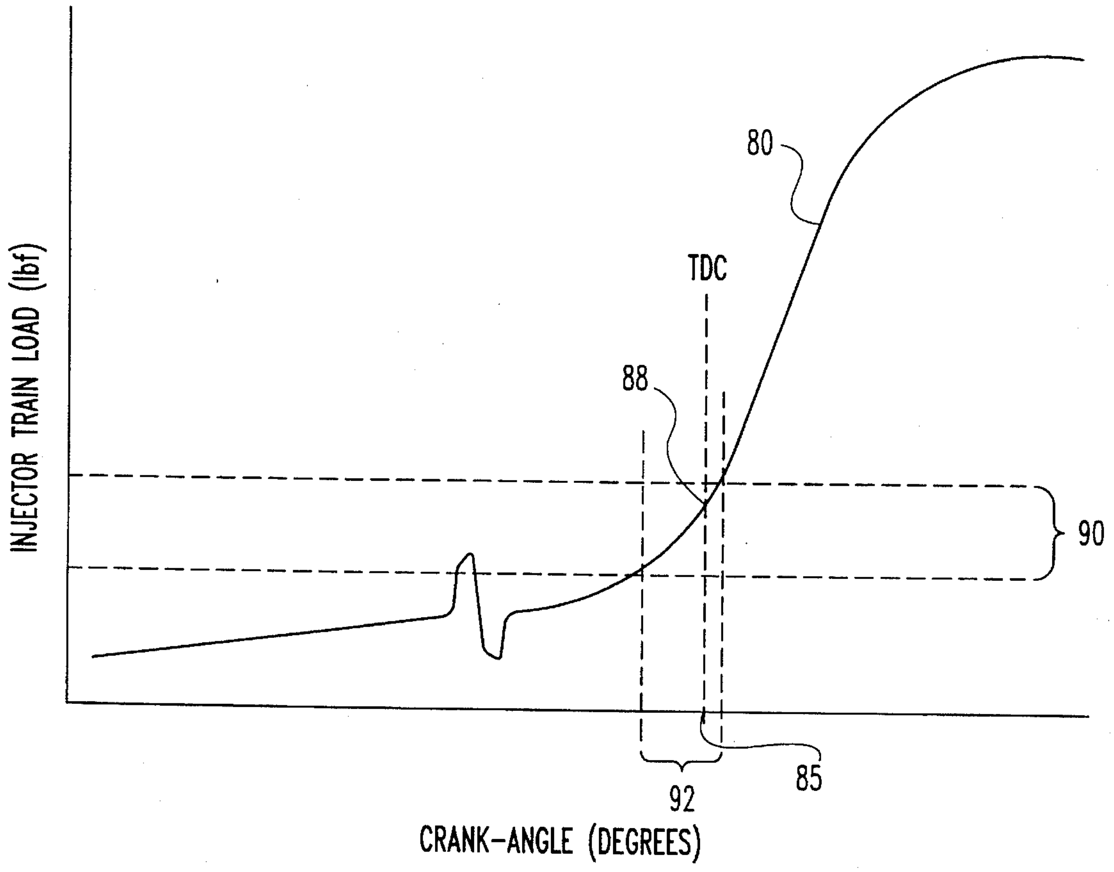
Fig. 3 (PRIOR ART)
FIG. 3 is a plot of injector train load versus crank shaft angle illustrating one known technique for determining SOI in the open nozzle fuel injection system of FIG. 1.
Figure 4:
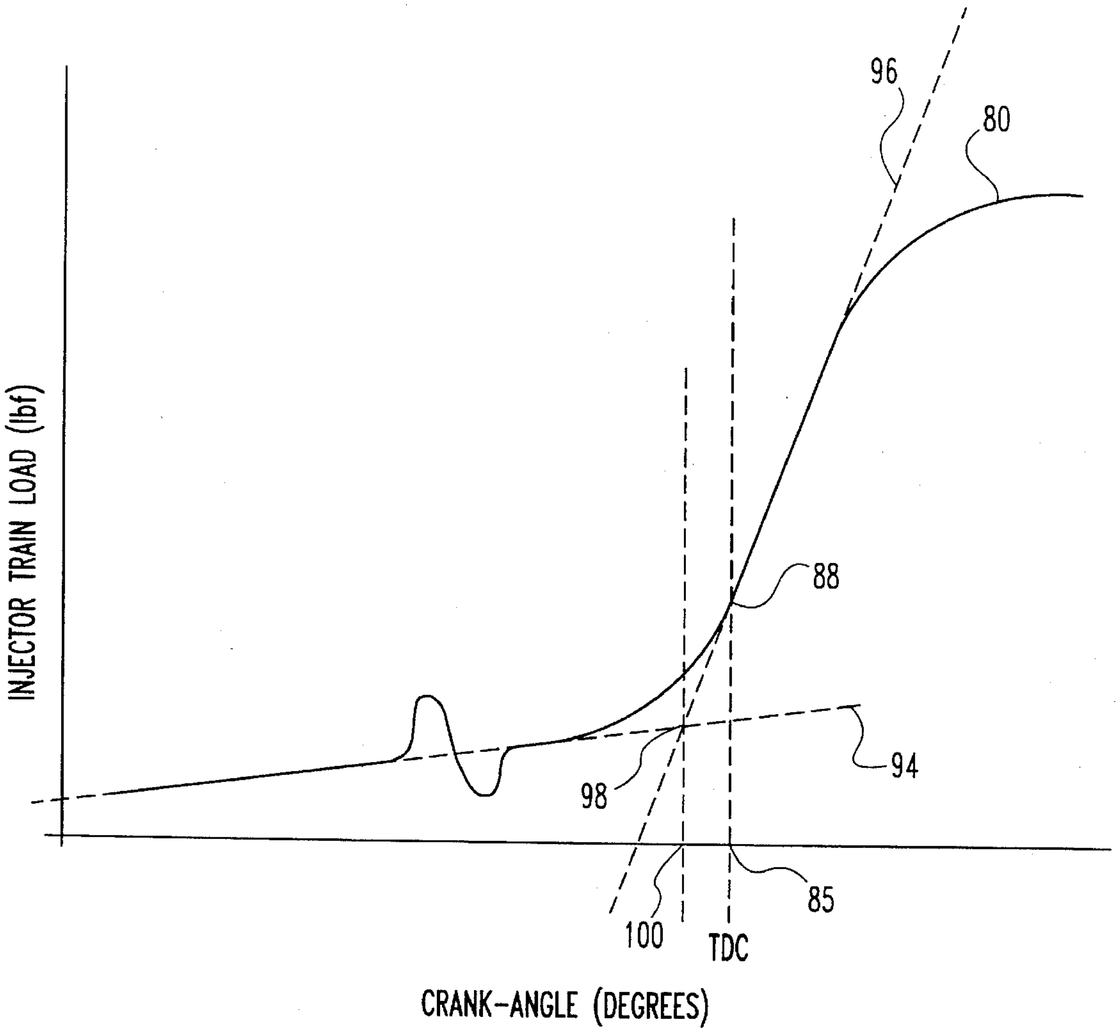
Fig. 4 (PRIOR ART)
FIG. 4 is a plot of injector train load versus crank shaft angle illustrating another known technique for determining SOI in the open nozzle fuel injection system of FIG. 1.
Figure 11A:
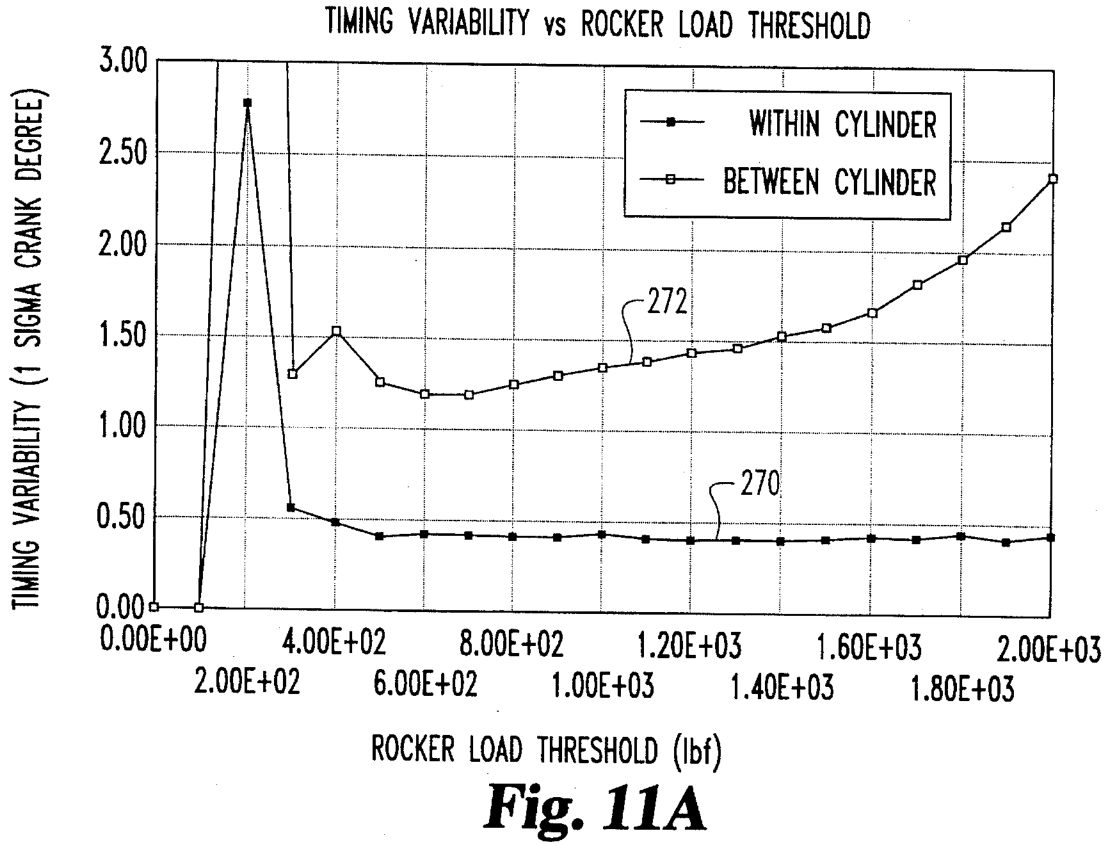
FIG. 11 is composed of FIGS. 11A and 11B and illustrates a comparison between the injector train load rate technique of the present invention and the known RLT technique in determining within cylinder and between cylinder timing variability.
Figure 11B:
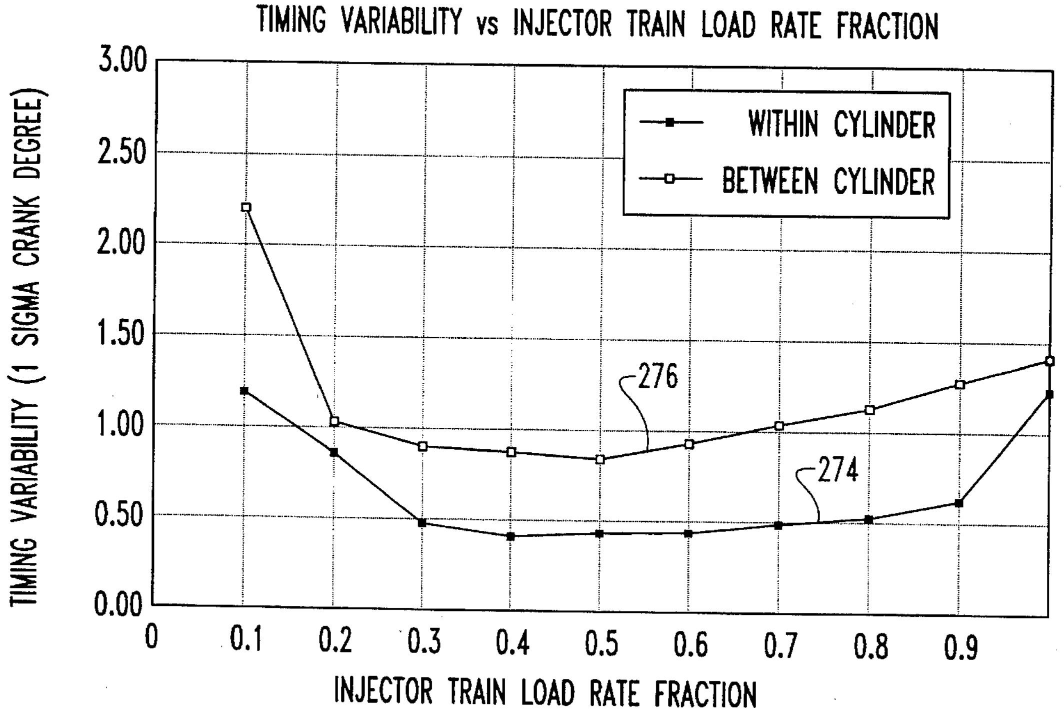

Referring now to FIGS. 11A and 11B, measured fuel injection timing variability in accordance with the injector train load rate threshold technique of the present invention is compared to measured fuel injection timing variability in accordance with the known RLT approach discussed in the BACKGROUND section, in the same engine equipped with a known TP-type (time-pressure) open nozzle fuel injector system and operating at peak torque conditions. Referring specifically to FIG. 11A, "within cylinder" fuel injection timing variability 270 and "between cylinder" fuel injection timing variability 272 are shown as measured in accordance with the RLT SOI criterion discussed in the BACKGROUND section with reference to FIG. 3. By contrast, FIG. 11B shows "within cylinder" fuel injection timing variability 274 and "between cylinder" fuel injection timing variability 276 as measured in accordance with the injector train load rate threshold technique of the present invention. A comparison between FIGS. 11A and 11B indicates that both techniques produce similar estimates of "within cylinder" fuel injection timing variability over a broad range of injector load thresholds (FIG. 11A) and injector load rate threshold fractions (FIG. 11B). However, estimates of "between cylinder" fuel injection timing variability produced by the injector train load rate threshold technique of the present invention are approximately 50% better on average than those produced in accordance with the known RLT approach of FIG. 11A.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the moving average data smoothing techniques described herein are not strictly limited to the use of quadratic polynomials per se, and may be implemented using any order polynomial, or other basis function.

What is claimed is:

1. In an internal combustion engine having a fuel injector actuated by a crank shaft via an injector train, a method of determining a crank shaft angle, relative to a predefined position thereof, at which start of injection (SOI) of fuel from the fuel injector occurs, the method comprising the steps of:

obtaining injector train load data as a function of crank shaft timing;

smoothing the injector train load data;

computing a first derivative of the smoothed injector train load data with respect to crank shaft timing;

locating a maximum value of the first derivative;

multiplying the maximum value of the first derivative by a predefined fraction; and mapping the predefined fraction of the maximum value of the first derivative to its corresponding crank shaft angle, said corresponding crank shaft angle defining the crank shaft angle at which SOI occurs.

2. The method of claim 1 wherein the obtaining step includes the steps of:

sensing injector train load and providing an injector train load signal corresponding thereto;

sensing crank shaft speed and providing a crank shaft speed signal corresponding thereto; and sampling the injector load signal as a function of said crank shaft speed signal at a predefined sampling rate.

3. The method of claim 2 wherein the smoothing step includes smoothing the injector train load data in accordance with the quadratic equation $y_i=ax_i^2+bx_i+c$, wherein $Y_i$ represents the smoothed injector train load data samples, $x_i$ represents the injector train load data samples, and coefficients a, b and c are recomputed for each data sample by minimizing a sum of square errors equation of the quadratic equation at a number of adjacent data samples.

4. The method of claim 3 wherein minimizing the sum of square errors at the number of adjacent data samples includes the steps of:

computing a firsts: derivative of the sum of square errors equation with respect to each of the coefficients a, b and c;

forming a system of equations by equating the first derivative of the sum of square errors equation with respect to each of the coefficients a, b and c to zero; and solving the system of equations for the coefficients a, b a c.

5. The method of claim 2 wherein the step of computing a first derivative is performed successively for each data sample in accordance with a numerical differentiation technique.

6. The method of claim 5 wherein the numerical differentiation technique is a fourth order accurate central finite difference relationship.

7. The method of claim 5 wherein the step of computing a maximum value of the first derivative includes searching the data samples of the first derivative for the maximum value thereof.

8. The method of claim 1 wherein the smoothing step is performed in accordance with a quadratic moving averaging data smoothing technique.

9. The method of claim 1 wherein the fuel injector is an open nozzle fuel injector.

10. The method of claim 1 wherein the smoothing step and the step of computing the first derivative are combined into a single smoothing and rate estimation step in accordance with a quadratic moving average rate estimation technique.

11. In an internal combustion engine having a fuel injector actuated by a crank shaft via an injector train, an apparatus for determining a crank shaft angle at which start of injection (SOI) of fuel from the fuel injector occurs, the apparatus comprising:

means for providing an injector train load signal corresponding to injector train load; and a computer having a first input port receiving said injector train load signal, said computer including means for processing said injector train load signal to produce injector train load data as a function of crank shaft timing;

means for computing a first derivative of said injector train load data with respect to crank shaft timing;

means for determining a maximum value of said first derivative;

means for computing a predefined fraction of said maximum value of said first derivative; and means for mapping said predefined fraction of said maximum value of said first derivative to its corresponding crank shaft angle, said corresponding crank shaft angle defining the crank shaft angle at which SOI occurs.

12. The apparatus of claim 11 wherein said computer further includes means for smoothing said injector train load signal prior to computing said first derivative.

13. The apparatus of claim 11 further including means for providing a crank shaft timing signal corresponding to crank shaft timing relative to a reference position thereof;

wherein said computer includes a second input port receiving said crank shaft timing signal;

and wherein said means for processing said injector train load signal further processes said crank shaft timing signal to produce injector train load data as a function of crank shaft timing.

14. The apparatus of claim 13 wherein said means for processing said injector train load signal and said crank shaft timing signal to produce said injector train load data corresponding to crank shaft timing includes means for sampling said injector train load signal and said crank shaft timing signal at a predefined sampling rate and producing a number of injector train load and corresponding crank shaft timing data pairs.

15. The apparatus of claim 13 wherein said means for providing a crank shaft timing signal corresponding to crank shaft timing relative to a reference position thereof is a crank shaft position sensor.

16. The apparatus of claim 15 wherein the crank shaft actuates a piston within a cylinder in communication with the fuel injector, the piston being actuated between a bottom dead center (BDC) position and a top dead center position (TDC);

and wherein said reference position of the crank shaft is the crank shaft position corresponding to TDC of the piston.

17. The apparatus of claim 11 wherein said means for processing said injector train load signal to produce said injector train load data as a function of crank shaft timing includes means for sampling said injector train load signal at a uniform sampling rate and producing a number of injector train load and corresponding crank shaft timing data pairs.

18. The apparatus of claim 11 wherein said computer further includes means for smoothing said injector train load data with respect to crank shaft timing.

19. The apparatus of claim 11 wherein said means for providing an injector train load signal corresponding to injector train load is a strain gauge sensor operatively associated with the injector train.

20. The apparatus of claim 11 wherein the fuel injector is an open nozzle fuel injector.

21. The apparatus of claim 20 wherein the open nozzle fuel injector is a unit fuel injector.

22. The apparatus of claim 21 wherein the internal combustion engine is a diesel engine.

23. In an internal combustion engine having a fuel injector actuated by a crank shaft via an injector train, all apparatus for determining a crank shaft angle at which start of injection (SOI) of fuel from the fuel injector occurs, the apparatus comprising:

an injector train load sensor providing an injector train load signal corresponding to injector train load;

a crank shaft timing sensor providing a crank shaft timing signal corresponding to crank shaft timing; and a computer having a first input port receiving said injector train load signal and a second input port receiving said crank shaft timing signal, said computer including a signal sampling portion sampling said injector train load signal and said crank shaft timing signal at a predefined sampling rate and producing a number of injector train load and corresponding crank shaft timing data pairs; and a data processing portion operable to compute a first derivative of said injector train load data with respect to said crank shaft timing data, compute a maximum value of said first derivative, compute a predefined fraction thereof, and map said predefined fraction of said maximum value of said first derivative to its corresponding crank shaft angle, said corresponding crank shaft angle defining the crank shaft angle at which SOI occurs.

24. The apparatus of claim 23 wherein the crank shaft actuates a piston within a cylinder in communication with the fuel injector, the piston being actuated between a bottom dead center (BDC) position and a top dead center position (TDC);

and wherein said crank shaft angle is referenced to a crank shaft position corresponding to TDC of the piston.

25. The apparatus of claim 23 wherein said data processing portion of said computer is further operable to smooth the injector train load data prior to computing said first derivative.

26. The apparatus of claim 23 wherein the fuel injector is an open nozzle fuel injector.

27. The apparatus of claim 26 wherein the open nozzle fuel injector is a unit fuel injector.

28. In combination:

an internal combustion engine having a fuel injector actuated by a crank shaft via an injector train; and an apparatus for determining a crank shaft angle at which start of injection (SOI) of fuel from the fuel injector occurs, the apparatus comprising:

an injector train load sensor providing an injector train load signal corresponding to injector train load; and a computer having a first input port receiving said injector train load signal, said computer including a signal processing portion processing said injector train load signal to produce injector train load data as a function of crank shaft timing; and a data processing portion operable to smooth said injector train load data, compute a first derivative of said smoothed injector train load data with respect to said crank shaft timing data, compute a maximum value of said first derivative, compute a predefined fraction thereof, and map said predefined fraction of said maximum value of said first derivative to its corresponding crank shaft angle, said crank shaft angle defining the crank shaft angle at which SOI occurs.

29. The combination of claim 28 wherein the fuel injector is an open nozzle fuel injector.

30. The combination of claim 29 wherein the open nozzle fuel injector is a unit injector.

31. The combination of claim 28 wherein the internal combustion engine is a diesel engine.

32. The combination of claim 28 wherein the apparatus further includes a crank shaft position sensor providing a crank shaft timing signal corresponding to crank shaft timing;

and wherein said computer further includes a second input port receiving said crank shaft timing signal, said signal processing portion further processing said crank shaft timing signal to produce injector train load data as a function of crank shaft timing.

33. The combination of claim 28 wherein the crank shaft actuates a piston within a cylinder in communication with the fuel injector, the piston being actuated between a bottom dead center (BDC) position and a top dead center position (TDC);

and wherein said crank shaft angle is referenced to a crank shaft position corresponding to TDC of the piston.

34. The combination of claim 28 wherein said signal processing portion of said computer is operable to sample said injector train load signal and said crank shaft timing signal at a predefined sampling rate and produce a number of injector train load and corresponding crank shaft timing data pairs.

35. The combination of claim 28 wherein said signal processing portion of said computer is operable to sample said injector train load signal at a uniform sampling rate, determine crank shaft timing data corresponding to a first one of said injector train load samples, and produce a number of injector train load and corresponding crank shaft timing data pairs.

36. The combination of claim 28 wherein said means for smoothing said injector train load data is operable to smooth said injector train load data in accordance with a quadratic moving average smoothing technique.

* * * * *